(12) United States Patent
Sakuma et al.

(10) Patent No.: US 9,379,549 B2
(45) Date of Patent: Jun. 28, 2016

(54) ELECTRIC POWER CONTROL SYSTEM AND METHOD

(75) Inventors: Hisato Sakuma, Minato-ku (JP); Koji Kudo, Minato-ku (JP); Hiroo Hongo, Minato-ku (JP); Ryosuke Kuribayashi, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 850 days.

(21) Appl. No.: 13/636,139

(22) PCT Filed: Feb. 14, 2011

(86) PCT No.: PCT/JP2011/053015
§ 371 (c)(1),
(2), (4) Date: Sep. 20, 2012

(87) PCT Pub. No.: WO2011/135891
PCT Pub. Date: Nov. 3, 2011

(65) Prior Publication Data
US 2013/0009485 A1  Jan. 10, 2013

(30) Foreign Application Priority Data

Apr. 26, 2010 (JP) .................................. 2010-100791

(51) Int. Cl.
*H02J 1/00* (2006.01)
*H02J 3/00* (2006.01)
*H02J 3/32* (2006.01)

(52) U.S. Cl.
CPC ................ *H02J 3/32* (2013.01); *Y10T 307/702* (2015.04)

(58) Field of Classification Search
CPC .................................................. Y10T 307/702
USPC ............ 307/18, 66, 72, 80, 81; 320/101, 103, 320/104; 700/286, 295
See application file for complete search history.

(56) References Cited

U.S. PATENT DOCUMENTS

| 9,136,726 B2 * | 9/2015 | Shinozaki ............ B60L 11/1864 |
| 2003/0047209 A1 * | 3/2003 | Yanai ........................ H02J 3/32 |
| | | 136/244 |
| 2009/0295330 A1 * | 12/2009 | Li ........................ H02J 7/0013 |
| | | 320/124 |

(Continued)

FOREIGN PATENT DOCUMENTS

| JP | 8251714 A | 9/1996 |
| JP | 2006-311707 A | 11/2006 |

(Continued)

OTHER PUBLICATIONS

Communication dated Mar. 17, 2015 from the Japanese Patent Office in counterpart application No. 2012-512691.

(Continued)

*Primary Examiner* — Rexford Barnie
*Assistant Examiner* — Rasem Mourad
(74) *Attorney, Agent, or Firm* — Sughrue Mion, PLLC

(57) ABSTRACT

In a predetermined interval, electric power that is generated by power-source equipment is charged to a storage device and the amount of electric power that is accumulated in the storage device is reported from a communication device to a device that is provided to an electric power provider or a consumer. After the passage of a predetermined time interval, the amount of electric power that was previously reported to the device that is provided to the electric power provider or the consumer is discharged from the storage device and supplied to the electric power distribution system.

12 Claims, 7 Drawing Sheets

(56) References Cited

U.S. PATENT DOCUMENTS

2010/0117452 A1* 5/2010 Dunnmon et al. ............... 307/72
2010/0174418 A1* 7/2010 Haugh ...................... G06F 1/26
  700/295

FOREIGN PATENT DOCUMENTS

| JP | 2006311707 A | * | 11/2006 |
| JP | 2006339077 A | | 12/2006 |
| JP | 3880471 B2 | | 2/2007 |
| JP | 2008-099527 A | | 4/2008 |
| JP | 2008-295175 A | | 12/2008 |
| JP | 2009-247108 A | | 10/2009 |
| JP | 2009247108 A | * | 10/2009 |
| JP | 2009-303411 A | | 12/2009 |

OTHER PUBLICATIONS

Takayama Satoshi, et al., "A Study on the Scheduling of Large-Scaled PV Power Station Output based on Solar Radiation Forecast", IEEJ Transactions on Power and Engery B, 2009, pp. 1514-1521, vol. 129, Issue 12.

International Search Report of PCT/JP2011/053015 dated May 17, 2011.

* cited by examiner

ELECTRIC POWER CONTROL SYSTEM AND METHOD

TECHNICAL FIELD

The present invention relates to an electric power control system and method for controlling electric power that is generated by power-source equipment and supplied to an electric distribution system.

BACKGROUND ART

Electric power providers that supply electric power have conventionally adjusted the electric power supplied to an electric distribution system by power generators that are capable of freely adjusting output power (adjustable power sources) according to variations in the anticipated power demand (amount of power consumption) and have thus achieved balance between supply and demand of power in the electric power distribution system. Thermal power plants, which are capable of adjusting output power at relatively high speed, are chiefly used as the adjustable power-source equipment.

Large-scale generators that include adjustable power sources typically require a certain amount of lead time from the state of halted operation until being capable of supplying electric power (in the order of at least 30 minutes). Thus, in order to deal with fluctuations in the demand for power, the above-described adjustable power source must be activated before the demand for electric power becomes great. When the anticipated range of fluctuation in the demand for power is particularly great, the amount of generated power by hydroelectric power plants or nuclear power plants, in which the output power cannot be freely adjusted (only to the extent that output power can be turned ON and OFF), must be decreased and a plurality of adjustable power sources must be activated. Normally, adjustable power sources such as thermal power plants are frequently operated at a low utilization rate, whereby increasing generation efficiency is problematic. As a result, the cost of power generation inevitably increases with increase in the adjustable power sources that are in operation.

Recent years have seen a demand for a major diffusion and expansion of renewable power sources such as photovoltaic generation (hereinbelow abbreviated as PV) and wind power generation (Wind Farms, hereinbelow abbreviated as "WF") that can reduce the release of warming gases during operation and that are directed toward realizing a sustainable society. However, the output of renewable power sources changes according to the weather. In other words, renewable power sources entail the problem of instability as regards the amount of power that can be generated.

Renewable power sources such as PV and WF are power generators in which the output power cannot be freely adjusted, and linking these renewable power sources to a power distribution system gives rise to further variations that cannot be controlled in the supplied power in addition to the above-described variations in the demand for electric power. This leads to an even greater need for adjustable power sources to cope not only with variation in the demand for power but with variations in supplied power as well. This leads to further increases in the costs of power generation for electric power providers and, when consumers that own renewable power sources sell back surplus power to a power provider, is a factor for setting a low price for the electric power that is sold.

In addition, in a electrical power distribution system that is linked to many renewable power sources, the possibility exists that even if adjustable power sources operate at a low utilization rate, the output power of the adjustable power sources and the generated electric power of renewable power sources may surpass the power demand, whereby the balance between supply and demand of electric power cannot be achieved, which can lead to instability of power frequency and power outages.

Still further, because consumers are increasingly able to choose electric power providers in recent years due to increased liberalization of the electric power market, adjustable power sources have also become necessary for absorbing the consequent differences in demand for electric power and the supplied electric power. Normally, the electric power that is supplied to a consumer is managed by the system operator (electric power provider) that manages the system to which the consumer is connected. Accordingly, when the consumer selects a power provider, the electric power provider that has contracted with the consumer does not necessarily coincide with the system operator that operates the system to which the consumer is connected. On the other hand, because power for the consumer is distributed by way of the system to which the consumer is connected (electric power forwarding), when the amount of power generated by the electric power provider with whom the consumer is contracted does not match the amount of power consumed by the consumer (power demand), the difference must be absorbed by the system to which the consumer is connected. In other words, the difference between the amount of generated power and the amount of demand increases in the electric power distribution system in which most electric power is used by forwarding electric power to another electric power provider, and adjustable power sources are again necessary for absorbing this difference. In order to resolve disparities in electric power adjustment between the electric power provider with whom the consumer is contracted and the system operator, a payment setup is currently adopted by which the amount of power generated by the electric power provider with whom the consumer is contracted and the amount of electric power consumed by the consumer (power demand) are each measured and recorded for every predetermined interval (for example, 30 minutes), and the consumer or the electric power provider with whom the consumer is contracted pays penalties to the system operator that manages the electric power distribution system of the consumer according to the differences between supply and demand.

As an example of a method of reducing unbalance in supply and demand of electric power in this type of electric power distribution system that is linked to renewable power sources, Non-Patent Document 1 proposes a method in which the amount of generated power by PV is estimated based on the estimated amount of solar radiation, and the amount of electric power that is to be supplied to the electric power distribution system (reverse power flow) based on the estimated amount of generated power is reported to the electric power provider in advance. Non-Patent Document 1 further proposes that the difference between the estimated amount of PV-generated power and the actual amount of generated power be absorbed by the charge and discharge of a storage device.

If the amount of power that is to be supplied to a electric power distribution system is in this way reported to the electric power provider in advance, the electric power provider is able to establish or amend the operating plans of, for example, a generator, based on the estimated amount of generated power of each PV. Alternatively, if the amount of power that is to be supplied to the electric power distribution system is reported to the consumer, the consumer is able to adjust the amount of power consumption based on the estimated amount of generated power of PV. As a result, balance in the supply and demand of electric power of the electric power distribution system can be achieved. In addition, reverse power flow refers to the supply of electric power that is generated by a renewable power source owned by the consumer to a power distribution substation of the electric power provider from the consumer.

As described hereinabove, Non-Patent Document 1 proposes the use of a PV for which the amount of generated power can be relatively easily estimated as a renewable power source, and further, the absorption of the difference between the estimated amount of generated power of the PV and the actual amount of generated power by the charge and discharge of a storage device. However, even a method of this type cannot avoid error between the amount of electric power that is reported to the electric power provider or consumer in advance and the amount of electric power that can actually be supplied to the electric power distribution system. In particular, when WF is used as the renewable power source, fluctuation in the amount of generated power due to weather conditions is great, whereby the amount of generated power is difficult to accurately predict.

Accordingly, balance between supply and demand of electrical power is difficult to achieve when error between the estimated amount of generated power that is reported to the electric power provider or consumer and the amount of power that can actually be supplied to the electric power distribution system is great and the amount of the linked renewable power sources to the electric power distribution system becomes great. In addition, when a multiplicity of adjustable power sources are prepared with consideration given to error between the estimated amount of power that is reported and the amount of electric power that is actually supplied to the electric power distribution system, the cost of power generation inevitably increases.

RELATED ART LITERATURE

Non-Patent Literature

Non-Patent Document 1: Takayama Satoshi, et al., "A Study on the Scheduling of Large-Scaled PV Power Station Output based on Solar Radiation Forecast," IEEJ Transactions on Power and Energy B, Volume 129, Issue 12 pp. 1514-1521 (2009).

SUMMARY

It is therefore an object of the present invention to provide an electric power control system and method that can accurately report to an electric power provider or consumer the amount of power that is to be supplied to a electric power distribution system.

The electric power control system of an exemplary aspect of the present invention for achieving the above-described object is an electric power control system for controlling the electric power that is supplied to an electric power distribution system and includes:

power-source equipment that supplies electric power that is generated;

a storage device that accumulates electric power that is generated by the power-source equipment;

a communication device for transmitting information to and receiving information from a device that is provided to an electric power provider or consumer that is connected to the electric power distribution system; and an arithmetic unit that, in a predetermined interval, both causes charging of electric power that has been generated by the power-source equipment to the storage device and uses the communication device to report the amount of electric power that has been accumulated in the storage device to a device that is provided to the electric power provider or the consumer, and after the passage of a predetermined time interval after this report, causes the amount of electric power that was reported to the device that is provided to the electric power provider or the consumer to be discharged from the storage device and supplied to the electric power distribution system.

Alternatively, the electric power control system of an exemplary aspect of the present invention for controlling electric power that is supplied to an electric power distribution system includes:

power-source equipment that supplies electric power that has been generated;

a storage device that accumulates electric power that was generated by the power-source equipment;

a communication device for transmitting information to and receiving information from a device that is provided to an electric power provider or consumer that is connected to the electric power distribution system; and an arithmetic unit that, in a predetermined interval, both causes charging of electric power that was generated by the power-source equipment to the storage device and uses the communication device to report the amount of electric power that has accumulated in the storage device to a device that is provided to the electric power provider or to the consumer, and after the passage of a predetermined time interval from this report, causes supply to the electric power distribution system of an amount of electric power that matches the amount of electric power that was reported to the device that is provided to the electric power provider or the consumer by means of electric power that is being generated in the power-source equipment and electric power that is discharged from the storage device or electric power that is charged to the storage device.

The electric power control method of an exemplary aspect of the present invention is an electric power control method for controlling electric power that is supplied to an electric power distribution system and that is provided with:

power-source equipment that supplies electric power that has been generated;

a storage device that accumulates electric power that was generated by the power-source equipment; and a communication device for transmitting information to and receiving information from a device that is provided to an electric power provider or consumer that is connected to the electric power distribution system;

the electric power control method including steps of:

an arithmetic unit:

in a predetermined interval, both causing charging of electric power that is generated by the power-source equipment to the storage device and using the communication device to report the amount of electric power that has accumulated in the storage device to a device that is provided to the electric power provider or consumer; and after the passage of a predetermined time interval from reporting, causes the amount of electric power that was reported to the device that is provided to the electric power provider or the consumer to be discharged from the storage device and supplied to the electric power distribution system.

Alternatively, the electric power control method of an exemplary aspect of the present invention is for controlling electric power that is supplied to the electric power distribution system and is provided with:

power-source equipment that supplies electric power that has been generated;

a storage device that accumulates electric power that was generated by the power-source equipment; and a communication device for transmitting information to and receiving information from a device that is provided to an electric power provider or consumer that is connected to the electric power distribution system;

the electric power control method including steps of:

an arithmetic unit, in a predetermined interval, both causing charging of electric power that has been generated by the power-source equipment to the storage device and using the communication device to report the amount of electric power that has accumulated in the storage device to a device that is provided to the electric power provider or consumer; and after the passage of a predetermined time interval from reporting, causing supply to the electric power distribution system of an amount of electric power that matches the amount of electric power that was reported to a device provided to the electric power provider or the consumer by means of electric power that is being generated by the power-source equipment and electric power that was discharged from the storage device or electric power that was charged to the storage device.

BRIEF DESCRIPTION OF DRAWINGS

FIG. 1 is a block diagram showing one example of the configuration of the electric power control system of the first exemplary embodiment.

FIG. 2 is a schematic view showing an example of the transition of operating modes of the storage device in the first exemplary embodiment.

FIG. 3 is a flow chart showing the processing procedure of the electric power control system of the first exemplary embodiment.

FIG. 4 is a graph showing an example of the operation of the electric power control system of the first exemplary embodiment.

FIG. 5 is a block diagram showing an example of the configuration of the electric power control system of the second exemplary embodiment.

FIG. 6 is a schematic view showing an example of the transitions of operating modes of the storage device in the second exemplary embodiment.

FIG. 7 is a flow chart showing the processing procedure of the electric power control system of the second exemplary embodiment.

FIG. 8 is a graph showing an example of the operation of the electric power control system of the second exemplary embodiment.

FIG. 9 is a block diagram showing an example of the configuration of the electric power control system of the third exemplary embodiment.

FIG. 10 is a schematic view showing an example of the transitions of operating modes of the storage device in the third exemplary embodiment.

FIG. 11 is a flow chart showing the processing procedure of the electric power control system of the third exemplary embodiment.

FIG. 12 is a graph showing an example of the operation of the electric power control system of the third exemplary embodiment.

EXEMPLARY EMBODIMENT

The present invention is next described with reference to the accompanying drawings.

In the present invention, electric power that is generated in power-source equipment such as a renewable power source is accumulated in a storage device that is equipped with a chargeable battery, and the electric power that has accumulated in the storage device is reported to a device that is provided in an electric power provider or consumer as electric power that is to be later supplied to the electric power distribution system. After the passage of a fixed time interval after reporting, the electric power that was previously reported to the electric power distribution system is actually supplied. By means of this method, the accurate amount of electric power that is to be supplied to the electric power distribution system is reported to the electric power provider or consumer. The actual method according to the present invention is next described in the first to third exemplary embodiments hereinbelow.

First Exemplary Embodiment

Figure 1:
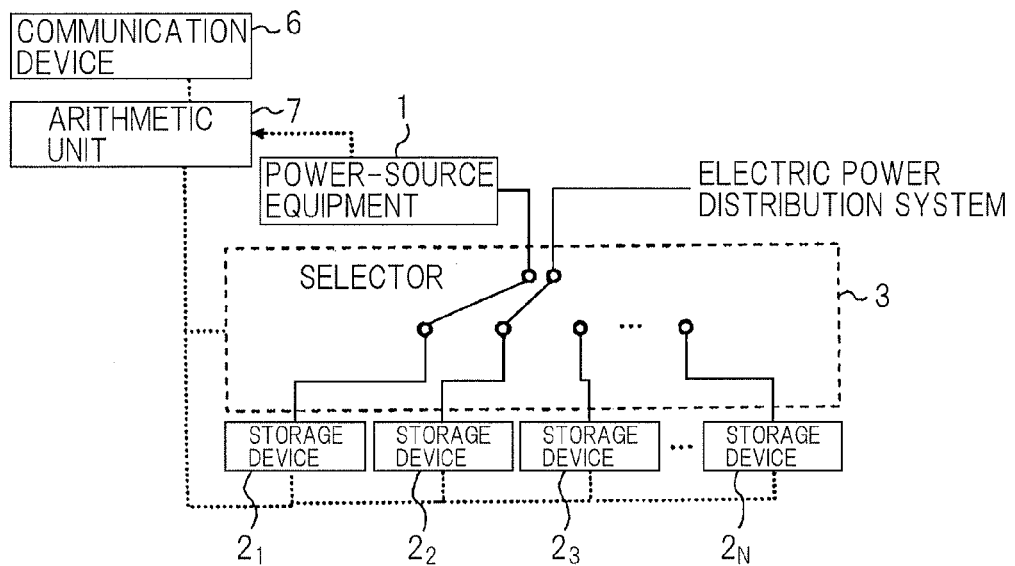
[FIG. 1]

FIG. 1 is a block diagram showing an example of the configuration of the electric power control system of the first exemplary embodiment.

As shown in FIG. 1, the electric power control system of the first exemplary embodiment is of a configuration that includes: power-source equipment 1 that supplies electric power that has been generated; N (where N is an integer equal to or greater than 3) storage devices $2_1$-$2_N$ that accumulate electric power that is generated in power-source equipment 1; selector 3 that is connected between power-source equipment 1 and storage devices $2_1$-$2_N$ as well as between storage devices $2_1$-$2_N$ and the electric power distribution system; communication device 6 for transmitting information to and receiving information from the electric power provider or consumer; and arithmetic unit 7 that controls the operations of power-source equipment 1, storage devices $2_1$-$2_N$, selector 3, and communication device 6. In addition, the solid lines that connect power-source equipment 1 and selector 3, selector 3 and storage devices $2_1$-$2_N$, and selector 3 and electric power distribution system shown in FIG. 1 indicate power lines for transmitting and receiving electric power. In addition, the dotted lines that connect communication device 6 and arithmetic unit 7, power-source equipment 1 and arithmetic unit 7, arithmetic unit 7 and selector 3, and arithmetic unit 7 and storage devices $2_1$-$2_N$ indicate information communication lines for transmitting and receiving information.

A renewable power source such as known PV or FW is used for power-source equipment 1. Power-source equipment 1 is not limited to a renewable power source and may employ any power supply apparatus that is capable of generating electric power. However, power-source apparatuses in which generated power is freely adjustable are excluded. In FIG. 1, an example of a configuration is shown that assumes a case in which electric power generated in power-source equipment 1 is used without alteration to charge storage devices $2_1$-$2_N$. When the electric power that is generated in power-source equipment 1 cannot be used without alteration to charge a chargeable battery, power-source equipment 1 may be provided with a known DC-DC converter that converts output voltage that conforms to the specifications of storage devices $2_1$-$2_N$, and when ac voltage is supplied from power-source equipment 1, power-source equipment 1 may be provided with a known AC-DC converter that converts the ac voltage to dc voltage. Power-source equipment 1 may further be provided with a known power conditioner for producing and supplying maximum electric power from the power source apparatus.

Storage devices $2_1$-$2_N$ are provided with known chargeable batteries capable of charging and discharging electricity and a known charge/discharge controller that controls charging to and discharging from the chargeable batteries. Examples of the chargeable batteries include lithium-ion batteries, nickel-hydrogen batteries, and sodium-sulfur batteries. The charge/discharge controller charges the chargeable batteries with electric power that was generated by power-source equipment 1 and supplies (discharges) electric power that has accumulated in the chargeable batteries to the electric power distribution system. Storage devices $2_1$-$2_N$ of the present exemplary embodiment are assumed to be provided with measurement units (not shown) that measure the amount of electric power that has accumulated in the chargeable batteries and that are capable of reporting the amount of electric power that was measured to arithmetic unit 7 by way of an information communication line. The measurement units can each be realized by, for example, a current detection circuit that is provided with a known coulomb counter that detects the charged/discharged current of the chargeable batteries and a CPU that adds up the current values that are measured by the coulomb counter and calculates the remaining capacity of the chargeable batteries.

In FIG. 1, an example of a configuration is shown that assumes that electric power that is generated by power-source equipment 1 is charged without alteration to the chargeable batteries provided in storage devices $2_1$-$2_N$, and the electric power that has accumulated in the chargeable batteries is supplied without alteration to the electric power distribution system. When electric power cannot be directly exchanged between power-source equipment 1 and storage devices $2_1$-$2_N$ and between storage devices $2_1$-$2_N$ and electric power distribution system, storage devices $2_1$-$2_N$ may be provided with, for example, a known DC-DC converter that adjusts the voltage (dc) that is supplied from power-source equipment 1 to a charging voltage that conforms with the specifications of the chargeable batteries, or when ac voltage is supplied from power-source equipment 1, storage devices $2_1$-$2_N$ may be provided with a known AC-DC converter that converts the ac voltage to dc voltage. In the case of a configuration in which the electric power distribution system transmits ac power, storage devices $2_1$-$2_N$ may be provided with an inverter that converts the electric power (dc) that is discharged from the chargeable batteries to ac power that can be supplied to the electric power distribution system. Storage devices $2_1$-$2_N$ may be further provided with a known protection device that prevents excessive charging or excessive discharging of the chargeable batteries.

Selector 3 is provided with a first traveling contact that is connected to the output terminal of power-source equipment 1, a second traveling contact that is connected to the electric power distribution system, and first to $N^{th}$ contacts that are connected to storage devices $2_1$-$2_N$, and by moving the first traveling contact and the second traveling contact in accordance with the instructions of arithmetic unit 7, selector 3 connects power-source equipment 1 and storage devices $2_1$-$2_N$ and connects the electric power distribution system and storage devices $2_1$-$2_N$. The electric power that is generated at power-source equipment 1 is charged to storage devices $2_1$-$2_N$ by way of selector 3, and the electric power that is discharged from storage devices $2_1$-$2_N$ is supplied to the electric power distribution system by way of selector 3.

Arithmetic unit 7 can be realized by, for example, integrated circuits that include a CPU or DSP and various types of logic circuits that execute predetermined processing in accordance with a program.

Communication device 6 is provided with functions for transmitting information to and receiving information from a device (not shown) that is provided to an electric power provider or a consumer that is connected to the electric power distribution system, this device being, for example, a device that sets up a power generation plan by an electric power provider or a device that sets up a consumption plan of a consumer (hereinbelow such devices are together referred to as "power planning devices"). As examples of a power planning device, devices can be realized as described in Japanese Patent No. 388047, Japanese Patent Laid-Open No. 2008-295175, and Japanese Patent Laid-Open No. 2009-303411. Known PLC (Power Line Communications) or BPL (Broadband over Power Lines) that use power lines or a communication system that employs the Internet or dedicated lines may be considered for the communication of information between communication device 6 and a power planning device as well as between arithmetic unit 7 and storage devices $2_1$-$2_N$ and selector 3. Alternatively, a known wireless communication system may be used for the communication of information between communication device 6 and a power planning device as well as between arithmetic unit 7 and storage devices $2_1$-$2_N$ and selector 3.

Arithmetic unit 7 and communication device 6 shown in FIG. 1 may be provided as separate devices, or may be realized by an information processing device (computer) that includes the functions of these devices.

In this type of configuration, the electric power control system of the first exemplary embodiment both charges electric power that was generated by power-source equipment 1 in a predetermined interval T to a storage device and reports to the above-described power planning device the amount of electric power that has accumulated in the storage device at the end time of this interval T as the amount of electric power that is to be supplied to the electric power distribution system. After the passage of $T \times (N-2) - T \times (N-1)$ from the report of the amount of electric power that is to be supplied to the electric power distribution system, the amount of electric power that was previously reported to the electric power distribution system is actually supplied. These processes are repeatedly executed using storage devices $2_1$-$2_N$.

An example is described hereinbelow in which electric power (W) is fixedly supplied from the electric power control system of the present exemplary embodiment to an electric power distribution system in interval T, but the electric power that is supplied to the electric power distribution system is not necessary fixed and may be varied. For example, when an electric power output pattern in interval T is designated from an electric power provider that manages the electric power distribution system, electric power may be supplied to the electric power distribution system in accordance with this electric power output pattern. However, the total amount of electric power (electric power×time: Wh) that can be supplied to the electric power distribution system in interval T must be the same for a case in which the electric power is fixedly supplied and for a case in which the electric power is supplied in the electric power output pattern that was designated.

Figure 2:
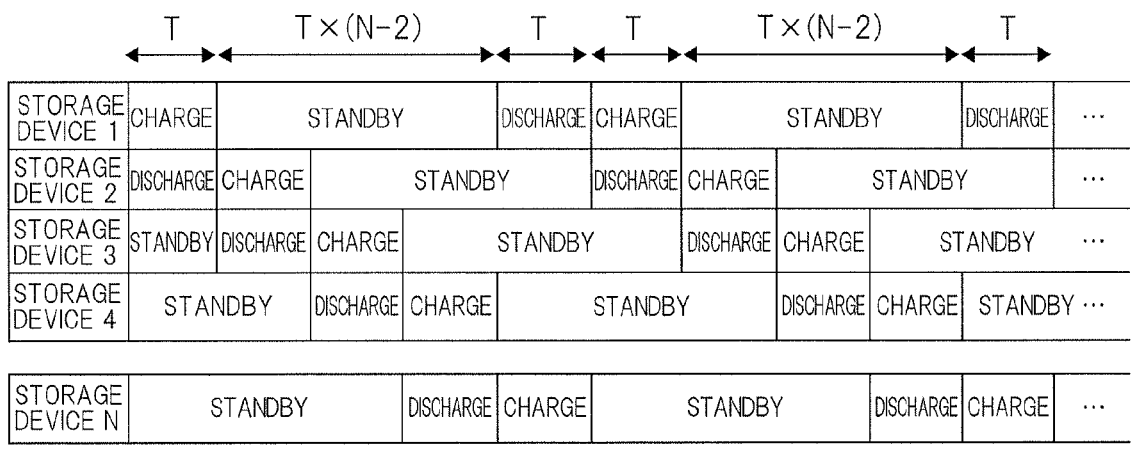
[FIG. 2]

FIG. 2 shows an example of transitions of operating modes of each storage device in the first exemplary embodiment. In FIG. 2, the passage of time is shown in the direction from left to right, and each row in FIG. 2 shows the operating modes of storage devices $2_1$-$2_N$ (storage devices 1-N).

The operating mode "charge" shown in FIG. 2 indicates the state in which electric power that was generated by power-source equipment 1 is being charged to a storage device. When a storage device is in the operating mode "charge," selector 3 connects the first traveling contact to the contact that corresponds to the storage device. As described hereinabove, when the operating mode of a storage device transitions from "charge" to "standby," arithmetic unit 7 acquires the value of the amount of electric power that has accumulated in the storage device (accumulated amount) and reports this value to the power planning device as "the amount of electric power to be supplied to the electric power distribution system after the passage of T×(N−2)−T×(N−1)."

The operating mode "discharge" shown in FIG. 2 indicates a state in which the discharged electric power of the storage device is being supplied to the electric power distribution system. When the storage device is in the operating mode "discharge," selector 3 connects the second traveling contact to the contact that corresponds to the storage device.

The operating mode "standby" shown in FIG. 2 indicates a state in which the storage device is neither charging nor discharging. When the storage device is in the operating mode "standby," selector 3 opens the contact corresponding to the storage device.

As shown in FIG. 2, in the electric power control system of the present exemplary embodiment, N storage devices $2_1$-$2_N$ are each repeatedly caused to operate in the three modes of charge, discharge, and standby, and the amount of electric power that is generated by power-source equipment 1 in interval T is actually supplied to the electric power distribution system after the passage of T×(N−2)−T×(N−1). Accordingly, the electric power control system of the present exemplary embodiment can be realized if three or more storage devices $2_1$-$2_N$ are provided.

In addition, in the electric power control system of the present exemplary embodiment, the operating modes of storage devices $2_1$-$2_N$ are caused to transition in the order of charge, standby, and discharge such that any one of the storage devices is set to the operating mode "charge" and any one of the storage devices is set to "discharge." Accordingly, electric power can be continuously supplied to the electric power distribution system.

Figure 3:
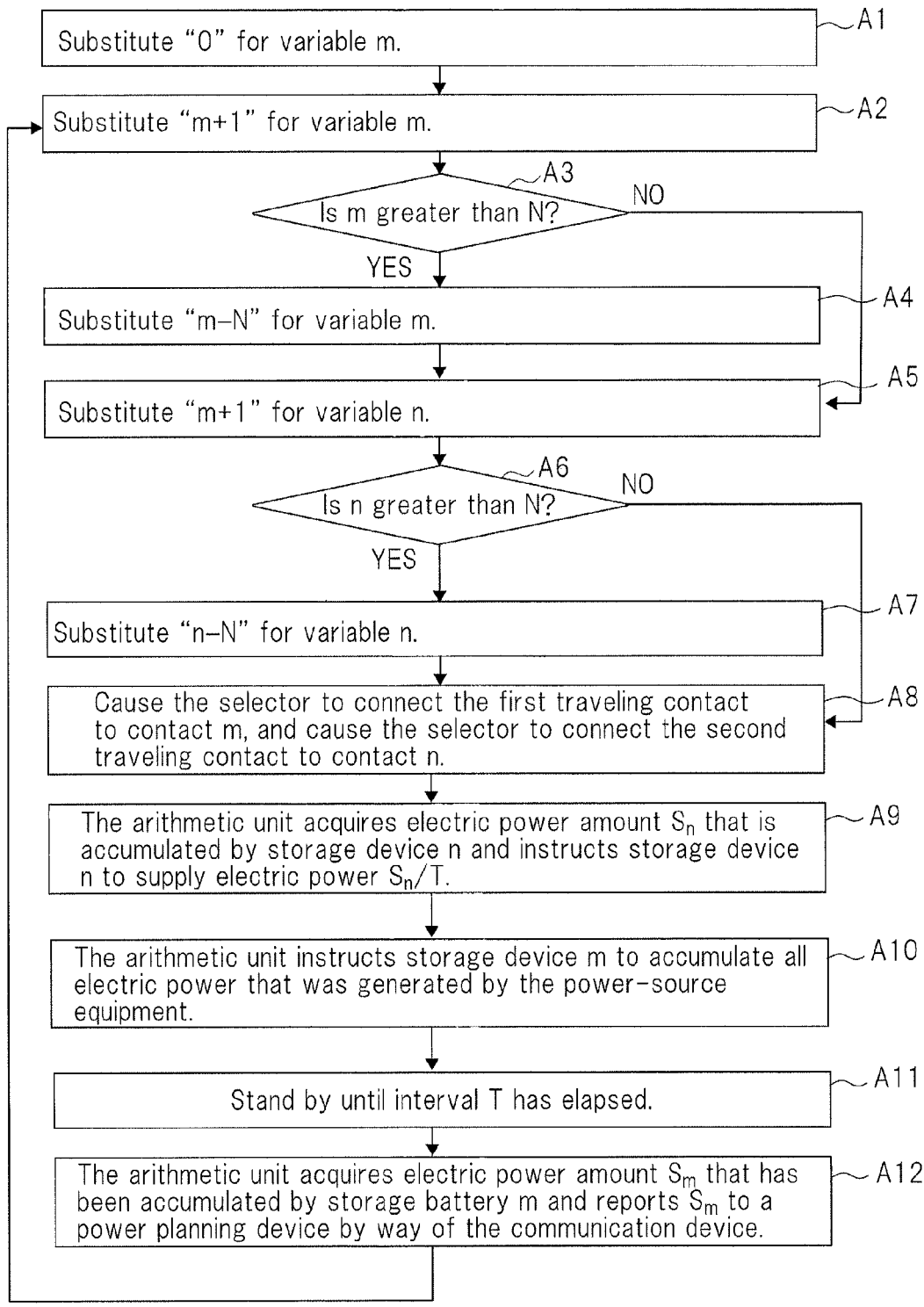
[FIG. 3]

FIG. 3 is a flow chart showing the processing procedure of the electric power control system of the first exemplary embodiment.

The processes shown in FIG. 3 are executed by arithmetic unit 7 shown in FIG. 1. In FIG. 3, an example is shown in which, of the N storage devices $2_1$-$2_N$, the $m^{th}$ (where m=1, 2, . . . , N) storage device is indicated by storage device m and electric power that is generated by power-source equipment 1 is charged to this storage device m, and the $n^{th}$ (where n=1, 2, . . . , N) storage device is indicated by storage device n and electric power that has accumulated in this storage device n is supplied to the electric power distribution system. In addition, the contact of selector 3 that is connected to storage device m in FIG. 3 is indicated by contact m, and the contact of selector 3 that is connected to storage device n is indicated by contact n.

As shown in FIG. 3, arithmetic unit 7 first substitutes "0" for variable m (Step A1).

Arithmetic unit 7 next substitutes "m+1" for variable m (Step A2) and judges whether m is greater than N (Step A 3). If m is greater than N, arithmetic unit 7 substitutes "m−N" for variable m (Step A4) and substitutes "m+1" for variable n (Step A5). If variable m is equal to or less than N in the process of Step A3, arithmetic unit 7 transitions to the process of Step A5 and substitutes "m+1" for variable n.

Arithmetic unit 7 next judges whether n is greater than N (Step A6), and if n is greater than N, substitutes "n−N" for variable n (Step A7) and causes selector 3 to connect the first traveling contact to contact m and connect the second traveling contact to contact n (Step A8). When variable n is equal to or less than N in the process of Step A6, arithmetic unit 7 transitions to the process of Step A8 and causes selector 3 to connect the first traveling contact to contact m and to connect the second traveling contact to contact n.

Arithmetic unit 7 next acquires accumulated amount Sn from storage device n, calculates the output electric power (Sn/T) in interval T, and instructs storage device n to supply this electric power Sn/T to the electric power distribution system (Step A9). In storage device n, electric power Sn that was generated by power-source equipment 1 in past interval T×(N−2) −T×(N−1)is being accumulated.

Arithmetic unit 7 further instructs storage device m to charge electric power that is being generated by power-source equipment 1 in interval T (Step A10).

Arithmetic unit 7 is in standby mode until the passage of interval T (Step A11) and reports the value of accumulated amount Sm of storage device m to the power planning device by way of communication device 7 as "the amount of electric power to be supplied to the electric power distribution system after the passage of T×(N−2)−T×N(−1)" (Step A12). Although not shown in FIG. 3, when information designating an electric power output pattern is transmitted from the electric power provider (or the consumer) in response to this report, arithmetic unit 7 may supply electric power to the electric power distribution system after the passage of T×(N−2)−T×(N−1) in accordance with this electric power output pattern.

When the process of Step A12 is completed, arithmetic unit 7 returns to the process of Step A2 and repeats the processes of Step A2-A12.

Although an example was shown in FIGS. 1-3 in which selector 3 connects storage devices $2_1$-$2_N$ to power-source equipment 1 one device at a time and connects storage devices $2_1$-$2_N$ to the electric power distribution system one device at a time, a plurality of storage devices may be connected to power-source equipment 1 at the same time, and a plurality of storage devices may be connected to the electric power distribution system at the same time. In that case, replacing the plurality of storage devices that are simultaneously connected to power-source equipment 1 by one storage device m and replacing the plurality of storage devices that are simultaneously connected to the electric power distribution system by one storage device n enables control similar to that described above.

In the present exemplary embodiment, when the maximum output of power-source equipment 1 is $W_{REmax}$ (W), the capacity of rechargeable batteries that are provided in storage devices $2_1$-$2_N$ is preferably at least $W_{REmax} \times T$(Wh). If the capacity of chargeable batteries is at least $W_{REmax} \times T$(Wh), even if power-source equipment 1 generates at maximum output in interval T, this electric power can all be accumulated in storage devices $2_1$-$2_N$. In this case, the electric power that is generated by power-source equipment 1 and then discarded without being used can be reduced.

In the electric power control system of the first exemplary embodiment, the total capacity of storage devices $2_1$-$2_N$ that is necessary is $W_{REmax} \times T \times N$(Wh), the interval from reporting the amount of electric power that is to be supplied to the electric power distribution system until the power is actually supplied is $T \times (N-2)$(h), and the time interval in which electric power can be supplied at any pattern is $T$(h).

Figure 4:
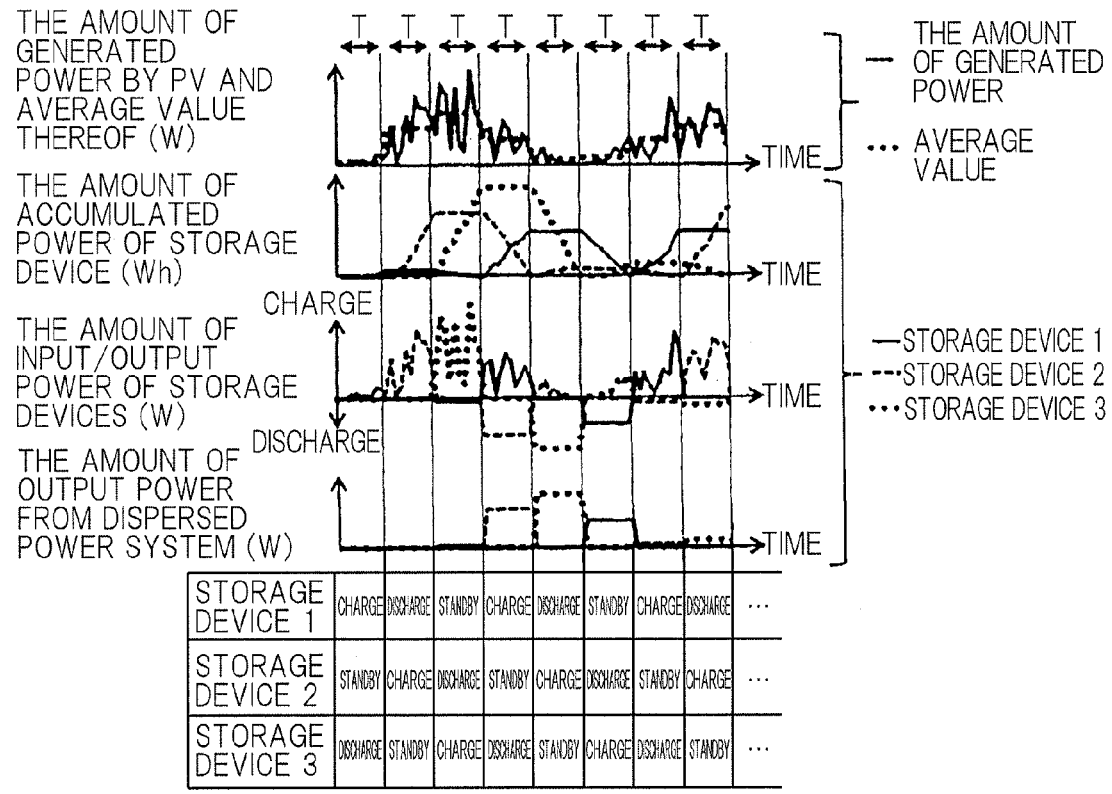
[FIG. 4]

FIG. 4 shows an example of a change in the amount of accumulated power (Wh) of storage devices $2_1$-$2_N$, the charge/discharge electric power (W), and the electric power that is supplied from the electric power control system of the present invention changes with respect to a change in the generated amount of power when the number N of storage devices is 3 and PV is used as power-source equipment 1. In addition, each graph shown in FIG. 4 shows the state for a case in which the electric power supplied to the electric power distribution system in interval T is fixed. In the table shown in FIG. 4, the operating mode of each storage device is shown as in FIG. 2.

According to the electric power control system of the first exemplary embodiment, the amount of electric power that actually accumulates in storage devices $2_1$-$2_N$ for every interval T is reported to the power planning device that is provided in the electric power provider or consumer, and after the passage of a fixed time interval, this reported amount of electric power is supplied to the electric power distribution system, whereby an accurate amount of electric power that is to be supplied to the electric power distribution system can be reported to the electric power provider or consumer.

In addition, because the electric power is actually supplied to the electric power distribution system after the passage of a fixed time interval from reporting the amount of electric power, a system operator that manages the electric power distribution system or an electric power provider that entrusts forwarding of electric power to another electric power provider is able to establish or amend a power generation plan based on an accurate amount of electric power that is reported even if there is a delay of communication device 6 or a lead time required for starting up generators.

Accordingly, an increase in power generation costs can be suppressed because there is no need to take into consideration error between the amount of electric power that is reported and the amount of electric power that is actually supplied to the electric power distribution system, and as a result, there is no need to prepare an adjustable power source. In addition, if an electric power provider that entrusts forwarding of power to another electric power provider establishes or amends a power generation plan based on an accurate amount of electric power that is reported, the electric power provider need not pay penalties to, for example, a system operator that manages a electric power distribution system to which the consumer is connected.

On the other hand, a consumer is able to establish or amend his or her own consumption plan based on an accurate amount of electric power that is reported. In addition, when electric power is supplied by power forwarding, the consumption of electric power based on the amount of electric power that is reported eliminates the need for paying penalties to the system operator that manages the electric power distribution system to which the consumer is connected.

Second Exemplary Embodiment

Figure 5:
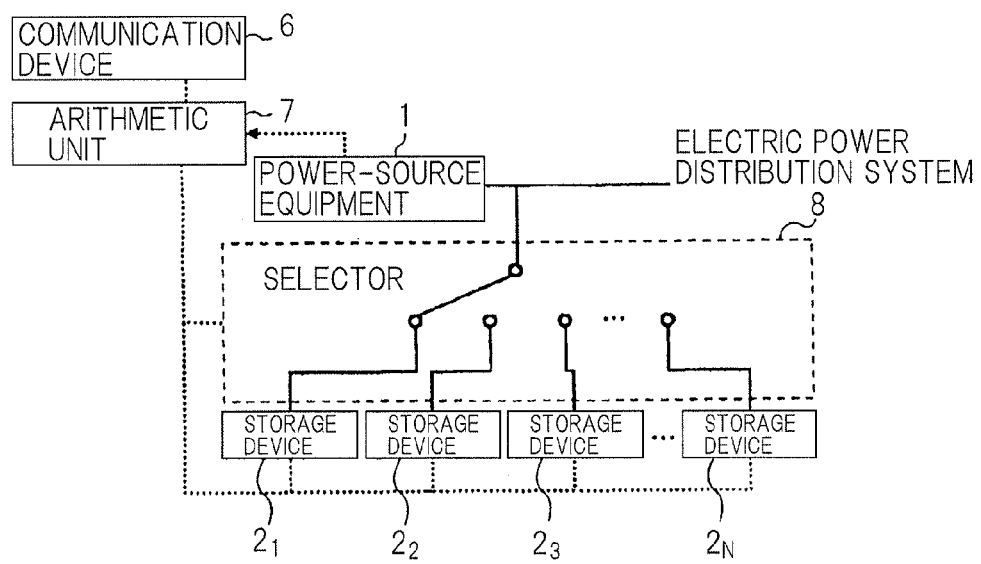
[FIG. 5]

FIG. 5 is a block diagram showing an example of the configuration of the electric power control system of the second exemplary embodiment.

As shown in FIG. 5, the electric power control system of the second exemplary embodiment is of a configuration in which selector 8 is provided with a first traveling contact that is connected to the output terminal of power-source equipment 1 and the input terminal of the electric power distribution system and first to $N^{th}$ contacts that are connected to storage devices $2_1$-$2_N$, and by moving the first traveling contact in accordance with the instructions of arithmetic unit 7, selector 8 connects power-source equipment 1 and the electric power distribution system with storage devices $2_1$-$2_N$. The electric power that is generated by power-source equipment 1 is charged to storage devices $2_1$-$2_N$ by way of selector 8 and the electric power that is discharged from storage devices $2_1$-$2_N$ is supplied to the electric power distribution system by way of selector 8. In addition, the electric power control system of the present exemplary embodiment, as will be described hereinbelow, can be realized if two or more storage devices $2_1$-$2_N$ are provided.

Power-source equipment 1 of the present exemplary embodiment is provided with, in addition to the same functions as power-source equipment 1 of the first exemplary embodiment, functions for measuring generated electric power and for reporting the measured value to arithmetic unit 7. The measurement of the generated electric power may employ a known electric power meter. In addition, storage devices $2_1$-$2_N$ of the present exemplary embodiment, in addition to the same functions as storage devices $2_1$-$2_N$ of the first exemplary embodiment, by means of charge/discharge controller, charges predetermined electric power of the electric power that is generated by power-source equipment 1 to chargeable batteries in accordance with instructions from arithmetic unit 7 and supplies (discharges) predetermined electric power from the electric power that has accumulated in chargeable batteries to the electric power distribution system in accordance with instructions from arithmetic unit 7. This type of charge/discharge controller can be realized by a known protection circuit for use by chargeable batteries that are provided with a known coulomb counter that detects the charge/discharge current of the chargeable batteries, a CPU that adds up the current value that was measured by the coulomb counter and calculates the remaining capacity of the chargeable batteries, and a switch that connects or cuts off the connection between the chargeable batteries and the electric power distribution system under the instructions of the CPU. The configuration is otherwise identical to the electric power control system of the first exemplary embodiment and redundant explanation is here omitted.

The electric power control system of the second exemplary embodiment causes N storage devices $2_1$-$2_N$ to successively transition between the two operating modes of charge/discharge and standby and supplies the amount of electric power that has accumulated in storage devices $2_1$-$2_N$ in the above-described interval T to the electric power distribution system after the passage of $T \times (N-1)$-$T \times N$. In other words, the electric power control system of the present exemplary embodiment can be realized if two or more storage devices $2_1$-$2_N$ are provided.

The operating mode "charge/discharge" here indicates a state of charging or discharging storage devices $2_1$-$2_N$. As shown in FIG. 5, in the electric power control system of the second exemplary embodiment, power-source equipment 1 and the electric power distribution system are simultaneously connected to one storage device 2, whereby the electric power that is currently being generated by power-source equipment 1 is also supplied to the electric power distribution system. If the amount of electric power that was previously reported to the power planning device is greater than the amount of electric power that is currently being generated by power-source equipment 1 at this time, this difference in the amount of electric power is compensated by the amount of electric power that has accumulated in storage device 2, and if the amount of electric power that was previously reported to the power planning device is less than the amount of electric power that is currently being generated by power-source equipment 1, this difference in the amount of electric power is charged to storage device 2.

Figure 6:
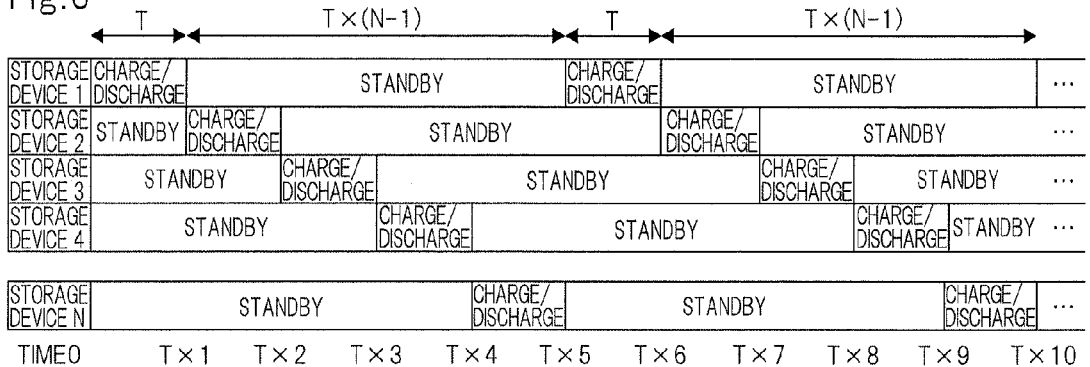
[FIG. 6]

FIG. 6 shows an example of the transitions of operating modes of each storage device in the second exemplary embodiment. In FIG. 6, the passage of time is shown in the direction from left to right, and each row in FIG. 6 shows the operating mode of each of storage devices $2_1$-$2_N$ (storage devices 1-N).

The operating mode "charge/discharge" shown in FIG. 6 indicates a state in which electric power is being charged to or discharged from storage device 2 as previously described. When storage device 2 is in the operating mode "Charge/Discharge," selector 8 connects the first traveling contact to the contact that corresponds to the storage device.

The operating mode "standby" shown in FIG. 6 indicates a state in which storage device 2 is neither charging nor discharging. When storage device 2 is in the operating mode "standby," selector 8 opens the contact that is connected to storage device 2.

As shown in FIG. 6, in the electric power control system of the present exemplary embodiment, the amount of electric power that was generated by power-source equipment 1 in the above-described interval T is supplied to the electric power distribution system after T×(N−1)−T×N by causing each of N storage devices $2_1$-$2_N$ to repeatedly operate in the two operating modes of "charge/discharge" and "standby."

In the electric power control system of the present exemplary embodiment, the operating modes of storage devices $2_1$-$2_N$ are caused to transition in the order of charge/discharge and standby such that any one storage device 2 is necessarily set to the operating mode "charge/discharge." As a result, electric power can be continuously supplied to the electric power distribution system.

Figure 7:
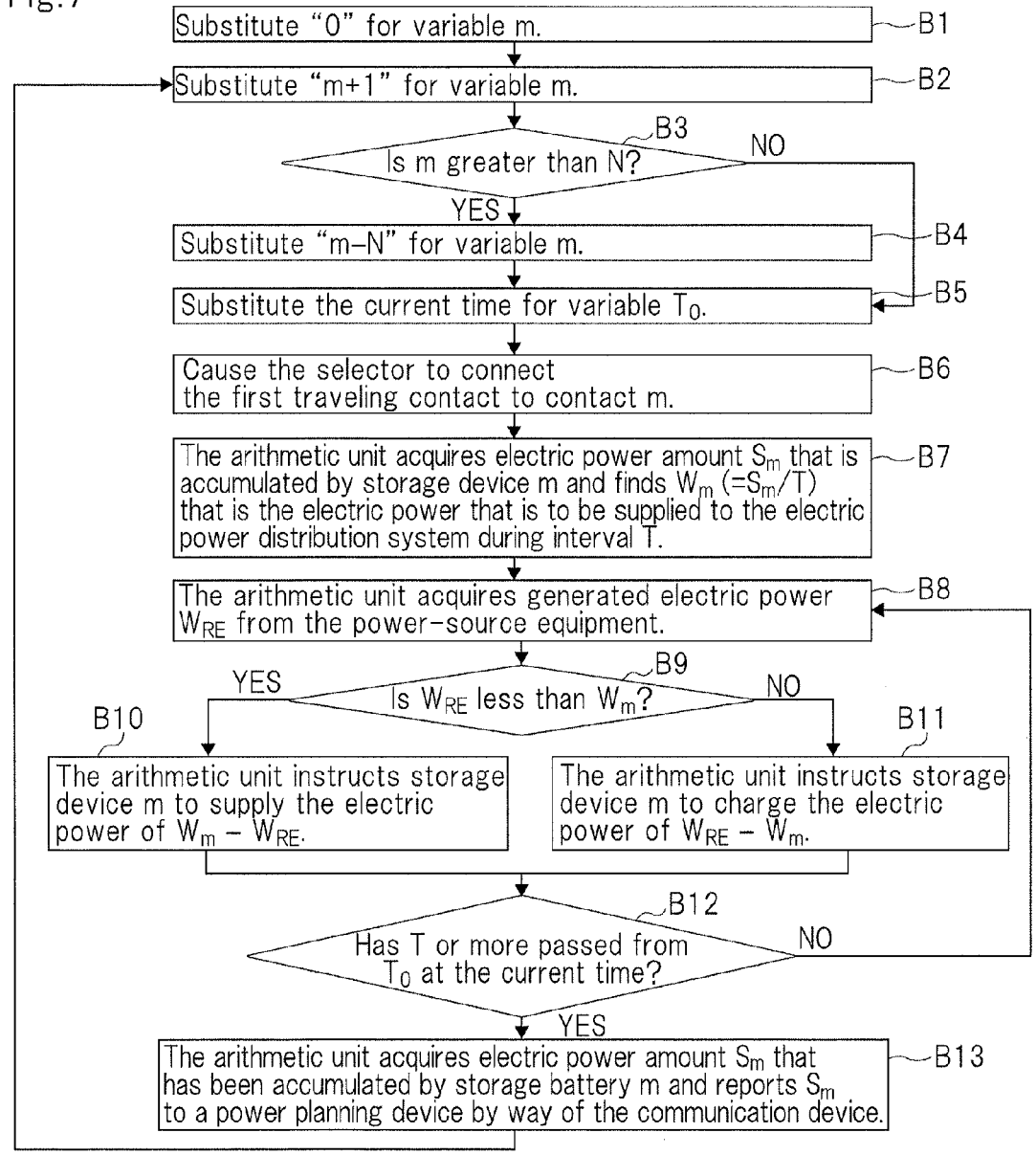
[FIG. 7]

FIG. 7 is a flow chart showing the processing procedure of the electric power control system of the second exemplary embodiment.

The processes shown in FIG. 7 are executed by arithmetic unit 7 shown in FIG. 5. In FIG.

7, an example is shown in which, of N storage devices $2_1$-$2_N$, the $m^{th}$ (where m=1, 2, . . . , N) storage device is indicated by storage device m, and in which the electric power that is generated by power-source equipment 1 is charged to this storage device m or the electric power that has accumulated in storage device m is supplied to the electric power distribution system. In addition, in FIG. 7, the contact of selector 8 that is connected to storage device m is shown by contact m.

As shown in FIG. 7, arithmetic unit 7 first substitutes "0" for variable m (Step B1).

Arithmetic unit 7 next substitutes "m+1" for variable m (Step B2) and judges whether m is greater than N (Step B3). If m is greater than N, arithmetic unit 7 substitutes "m−N" for variable m (Step B4) and records the current time in variable T0 (Step B5). If variable m is equal to or less than N in the process of Step B3, arithmetic unit 7 transitions to the process of Step B5 and records the current time in variable T0.

Arithmetic unit 7 next causes selector 8 to connect the first traveling contact to contact m (Step B6). At this time, electric power amount Sm that was generated by power-source equipment 1 in past interval T×(N−1)−T×N has accumulated in storage device m.

Arithmetic unit 7 acquires the value of this accumulated amount Sm(Wh) from storage device m and finds the output electric power Wm (=Sm/T) to the electric power distribution system in interval T (Step B7).

As described hereinabove, power-source equipment 1 and the electric power distribution system are connected to storage device m, and the electric power that is currently being generated by power-source equipment 1 is therefore supplied to the electric power distribution system. As a result, arithmetic unit 7 acquires the electric power $W_{RE}$(W) that is currently being generated from power-source equipment 1 (Step B8) and judges whether $W_{RE}$ is less than Wm (Step B9).

If $W_{RE}$ is less than Wm, arithmetic unit 7 instructs storage device m to discharge the electric power Wm-$W_{RE}$ such that the electric power of Wm can be supplied to the electric power distribution system (Step B10). On the other hand, if $W_{RE}$ is equal to or greater than Wm, arithmetic unit 7 instructs storage device m to charge the electric power $W_{RE}$-Wm such that the electric power of Wm is supplied to the electric power distribution system (Step B11).

Arithmetic unit 7 next judges whether T or more time has elapsed from T0 at the current time (Step B12), and if T or more time has not passed from T0 at the current time, repeats the processes of Steps B8-B12.

If T or more time has passed from T0 at the current time, arithmetic unit 7 acquires electric power amount Sm that has accumulated from T0 to T from storage device m and reports this electric power amount Sm to the power planning device by way of communication device 6 as the "electric power amount to be supplied to the electric power distribution system after T×(N−1)−T×N" (Step B13). Although not shown in FIG. 7, when information designating a power output pattern is transmitted from the electric power provider (or the consumer) in response to this report, arithmetic unit 7 may supply electric power to the electric power distribution system after T×(N−1)−T×N in accordance with this electric power output pattern.

When the process of Step B13 is completed, arithmetic unit 7 returns to the process of Step B2 and repeats the processes of Steps B2-B13.

In FIGS. 5-7, an example is shown in which storage devices $2_1$-$2_N$ are connected one device at a time to power-source equipment 1 and the electric power distribution system by means of selector 8, but a plurality of storage devices may also be simultaneously connected to power-source equipment 1 and the electric power distribution system. In this case, if the plurality of storage devices that are simultaneously connected to power-source equipment 1 and the electric power distribution system is replaced by one storage device m, the same control as described above is possible.

In the present exemplary embodiment, when the maximum output of power-source equipment 1 is $W_{REmax}$(W), the capacity of the chargeable batteries that are provided to storage devices $2_1$-$2_N$ is preferably at least $W_{REmax}$×T(Wh). If the capacity of the chargeable batteries is equal to or greater than $W_{REmax}$×T(Wh), all of the electric power that is generated at maximum output by power-source equipment 1 in interval T can be accumulated in storage devices $2_1$-$2_N$. In that case, the electric power that is generated by power-source equipment 1 but that is discarded without being used can be reduced.

In the electric power control system of the second exemplary embodiment, the total required capacity of storage devices $2_1$-$2_N$ is $W_{REmax}$×T×N(Wh), the interval from reporting the amount of electric power that is to be supplied to the electric power distribution system until the electric power is actually supplied is T×(N−1)(h), and the time that electric power can be supplied by any pattern is T(h).

Figure 8:
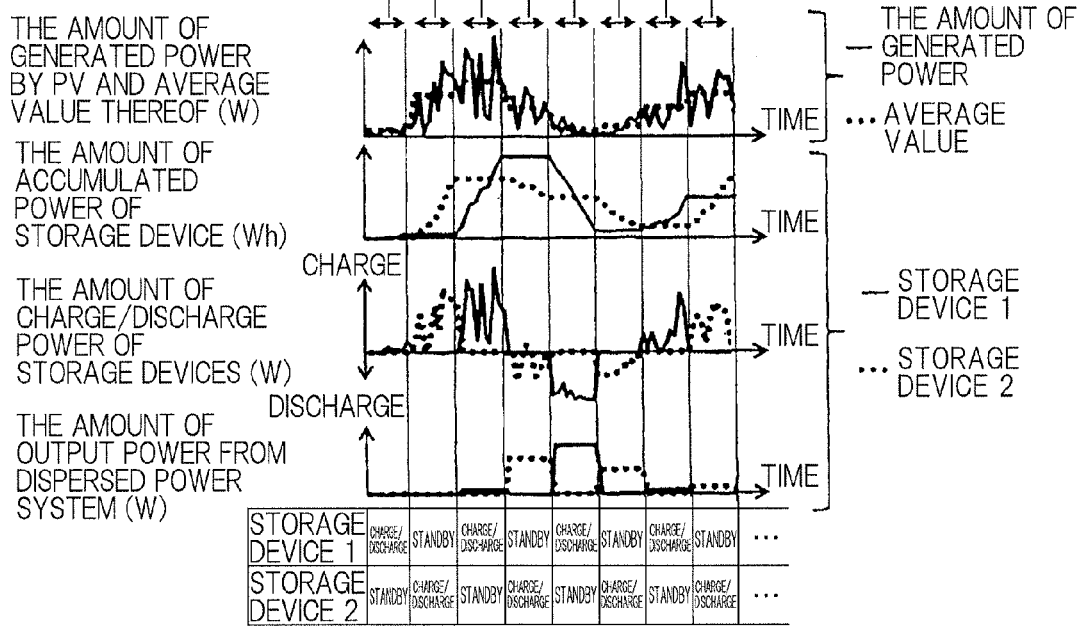
[FIG. 8]

FIG. 8 shows an example of the changes in accumulated amount (Wh) of storage devices $2_1$-$2_N$, the charge/discharge electric power (W), and electric power that is supplied from the electric power control system of the present exemplary embodiment with respect to changes in the amount of generated power when the number N of storage devices is "2" and PV is used as power-source equipment 1. In addition, each graph shown in FIG. 8 shows a state in which the electric power supplied to the electric power distribution system is fixed in interval T. As in FIG. 6, the table shown in FIG. 8 shows the operating modes of each of storage devices $2_1$-$2_N$.

The electric power control system of the second exemplary embodiment is able to both obtain the same effects as the electric power control system of the first exemplary embodiment, and further, is able to decrease the number of storage devices $2_1$-$2_N$.

Third Exemplary Embodiment

Figure 9:
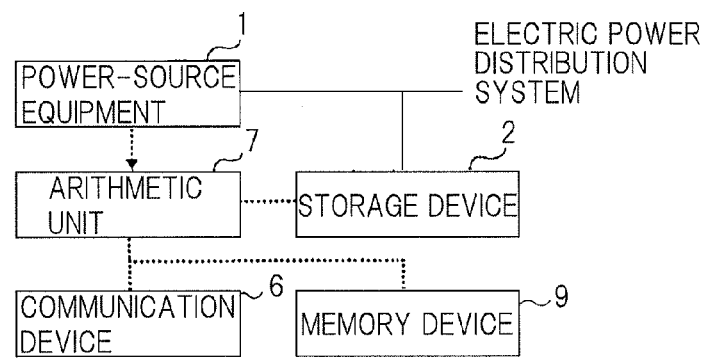
[FIG. 9]

FIG. 9 is a block diagram showing an example of the configuration of the electric power control system of the third exemplary embodiment.

As shown in FIG. 9, the electric power control system of the third exemplary embodiment is of a configuration in which one storage device 2 is directly connected to the output terminal of power-source equipment 1 and the electric power distribution system and that is further provided with memory device 9 for recording the amount of electric power that has accumulated in storage device 2 every interval T. The configuration is otherwise the same as that of the electric power control system of the second exemplary embodiment, and redundant explanation is therefore here omitted. Memory device 9 may be realized by a magnetic disk, a semiconductor memory, an optical disk, or other recording medium. Arithmetic unit 7, communication device 6, and memory device 9 shown in FIG. 9 may be provided as separate components or may be realized by an information processing device (computer) that includes the functions of these devices.

In the electric power control system of the third exemplary embodiment, one storage device 2 is caused to successively transition between the two operating modes of charge/discharge and standby as in the second exemplary embodiment, and the amount of electric power that has accumulated in storage device 2 in the above-described interval T is supplied to the electric power distribution system after T×(N−1)−T×N.

Here, N indicates the number of regions to which one storage device 2 is virtually set in order to transition between two operating modes of charge/discharge or standby as in the second exemplary embodiment. The regions are virtually set according to interval T and N, and N is not meant to imply that storage device 2 is physically divided into N regions.

The operating mode "charge/discharge" indicates a state in which storage device 2 is being charged or discharged, as in the second exemplary embodiment. As shown in FIG. 9, in the electric power control system of the third exemplary embodiment, power-source equipment 1 and the electric power distribution system are each connected to one storage device 2, whereby the electric power that is currently being generated in power-source equipment 1 is supplied to the electric power distribution system, as in the second exemplary embodiment. If the amount of electric power that was previously reported to the power planning device is greater than the amount of electric power that is currently being generated by power-source equipment 1 at this time, this difference in the amount of electric power is compensated by the amount of electric power that has accumulated in storage device 2, and if the amount of electric power that was previously reported to the power planning device is less than the amount of electric power that is currently being generated by power-source equipment 1, this difference in the amount of electric power is charged to storage device 2.

Figure 10:
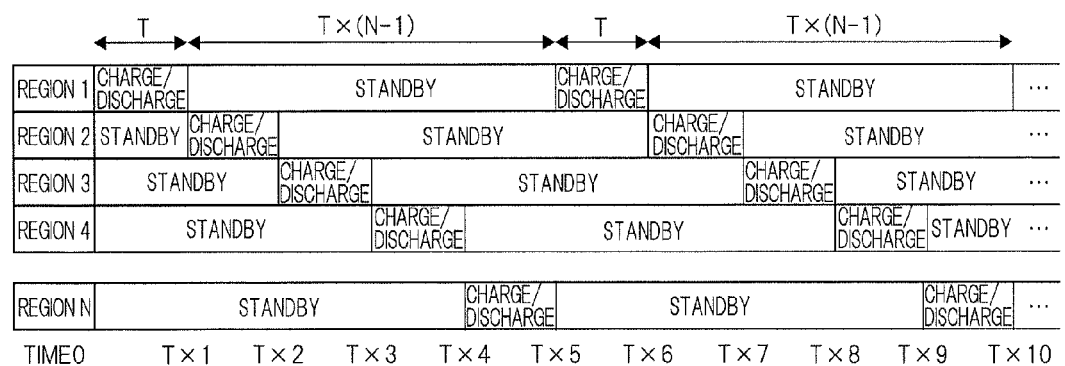
[FIG. 10]

FIG. 10 shows an example of the transition of operating modes of a storage device in the third exemplary embodiment. In FIG. 10, the passage of time is shown in the direction from left to right, and each row of FIG. 10 shows each of the operating modes of each of regions 1-N of storage device 2.

The operating mode "charge/discharge" shown in FIG. 10 indicates the state in which storage device 2 is being charged or discharged, as described hereinabove. In addition, the operating mode "standby" shown in FIG. 10 indicates a state in which storage device 2 is neither being charged nor discharged.

As shown in FIG. 10, in the electric power control system of the present exemplary embodiment, one storage device 2 is virtually divided among N regions, each region being caused to repeatedly operate in the two operating modes of charge/discharge and standby and the amount of electric power that is generated by power-source equipment 1 in the above-described interval T being supplied to the electric power distribution system after T×(N−1)−T×N.

In the electric power control system of the present exemplary embodiment, the operating mode of each region is caused to transition in order between charge/discharge and standby modes such that any one region is necessarily set to the operating mode "charge/discharge." As a result, electric power can be continuously supplied to the electric power distribution system. In the present exemplary embodiment, storage device 2 is one device as described hereinabove, and as a result, when storage device 2 is caused to transition between operating modes as shown in FIG. 10, storage device 2 does not actually transition to the operating mode "standby."

Figure 11:
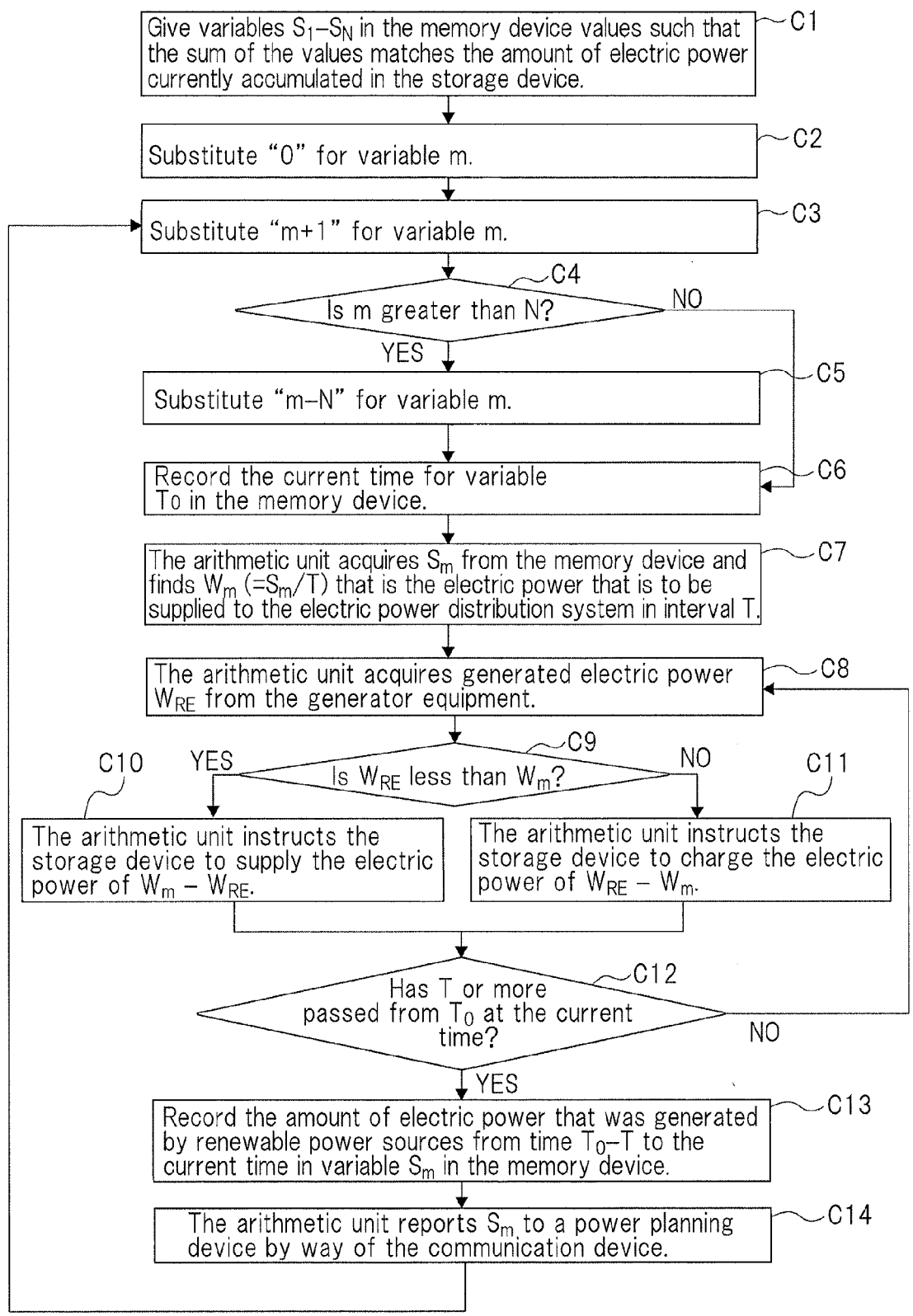
[FIG. 11]

FIG. 11 is a flow chart showing the processing procedure of the electric power control system of the third exemplary embodiment.

The processes shown in FIG. 11 are executed by arithmetic unit 7 shown in FIG. 9. In addition, an example is shown in FIG. 11 in which region m (where m=1, 2, . . . , N) of the N regions of storage device 2 is in the operating mode "charge/discharge" and electric power that is generated by power-source equipment 1 is being charged to this region m, or electric power that has accumulated in region m is being supplied to the electric power distribution system.

As shown in FIG. 11, arithmetic unit 7 first gives values to electric power amounts $S_1$-$S_N$ of each of the N regions of storage device 2 that were stored in memory device 9 such that the sum of these amounts matches the amount of electric power that is currently accumulated in storage device 2. For example, a value obtained by dividing the amount of electric power that is currently accumulated in storage device 2 by N is equally substituted for electric power amounts $S_1$-$S_N$ of each region (Step C1).

Arithmetic unit 7 next substitutes "0" for variable m that is saved in memory device 9 (Step C2).

Arithmetic unit 7 next substitutes "m+1" for variable m (Step C3) and judges whether m is greater than N (Step C4). If m is greater than N, arithmetic unit 7 substitutes "m−N" for variable m (Step C5) and records the current time in variable T0 (Step C6). If variable m is less than or equal to N in the process of Step C4, arithmetic unit 7 proceeds to the process of Step C6 and records the current time in variable T0.

Arithmetic unit 7 next obtains the value of accumulated amount Sm(Wh) of region m from memory device 9 and finds output power Wm (=Sm/T) to the electric power distribution system in interval T (Step C7).

As described hereinabove, storage device 2 is connected to power-source equipment 1 and the electric power distribution system, and the electric power that is currently being generated by power-source equipment 1 is therefore supplied to the electric power distribution system.

As a result, arithmetic unit 7 obtains the value of electric power $W_{RE}(W)$ that is currently being generated from power-source equipment 1 (Step C8) and judges whether $W_{RE}$ is less than Wm (Step C9).

If $W_{RE}$ is less than Wm, arithmetic unit 7 instructs storage device 2 to discharge the electric power of Wm-$W_{RE}$ such that the electric power of Wm can be supplied to the electric power distribution system (Step C10). On the other hand, if $W_{RE}$ is equal to or greater than Wm, arithmetic unit 7 instructs storage device 2 to charge the electric power of $W_{RE}$-Wm such that the electric power of Wm can be supplied to the electric power distribution system (Step C11).

Arithmetic unit 7 next judges whether T or more has passed from T0 at the current time (Step C12), and if T or more has not passed from T- at the current time, repeats the processes of Steps C8-C12.

If T or more has passed from T0 at the current time, arithmetic unit 7 records the amount of electric power Sm that has accumulated in storage device 2 from T0 to T in memory device 9 (Step C13) and reports the amount of electric power Sm to the power planning device by way of communication device 6 as "the amount of electric power that is to be supplied to the electric power distribution system after T×(N−1)−T× N" (Step C14). Although not shown in FIG. 11, if information has been transmitted that designates an electric power output pattern from the electric power provider (or consumer) in response to this report, arithmetic unit 7 may supply electric power to the electric power distribution system after T×(N−1)−T×N in accordance with this electric power output pattern.

When the process of Step C14 has been completed, arithmetic unit 7 returns to the process of Step C3 and repeats the processes of Steps C3-C14.

If the maximum output of power-source equipment 1 is $W_{RE}(W)$, the capacity of the chargeable battery that is provided to storage device 2 is preferably at least $W_{REmax} \times T$ (Wh). If the capacity of the chargeable battery is at least $W_{REmax} \times T(Wh)$, all of the electric power generated by power-source equipment 1 in interval T can be accumulated in storage device 2 even at maximum output. In this case, electric power that is generated at power-source equipment 1 but that is discarded without being used can be decreased.

In the electric power control system of the third exemplary embodiment, the required total capacity of storage device 2 is $W_{REmax} \times T \times N(Wh)$, the interval from reporting the amount of electric power that is to be supplied to the electric power distribution system until the electric power is actually supplied is T×(N−1)(h), and the time that electric power can be supplied by any pattern is T(h).

Figure 12:
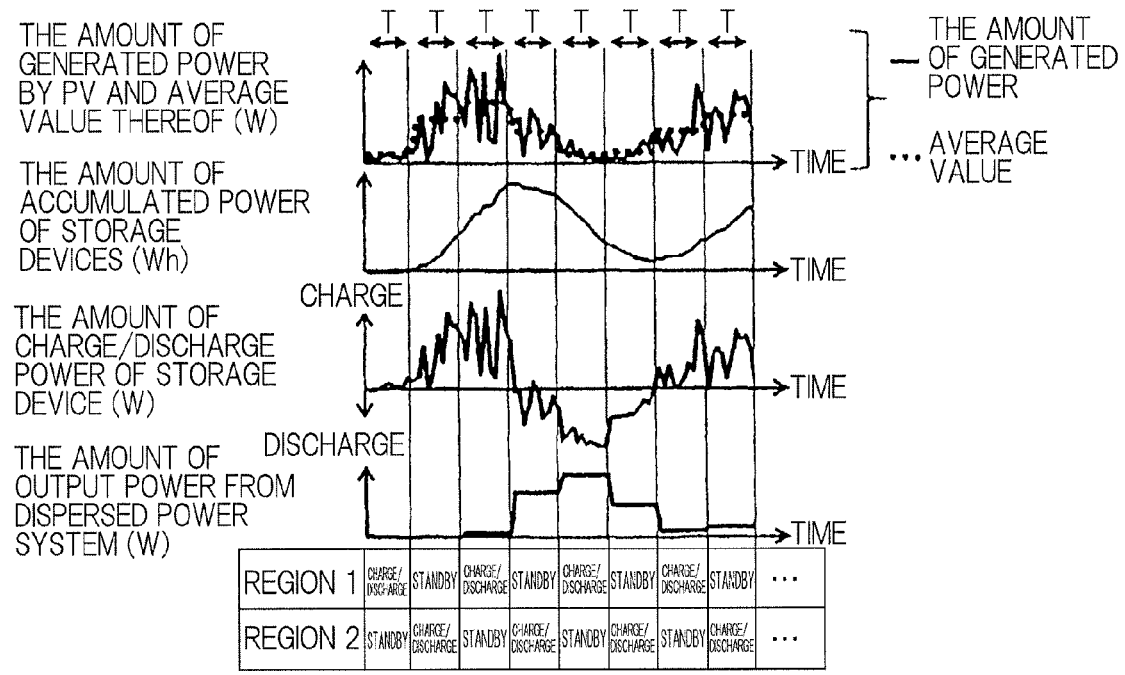
[FIG. 12]

FIG. 12 shows an example of the state of changes of the accumulated amount (Wh) of a storage device, the charge/discharge electric power (W), and the electric power that is supplied from the electric power control system of the present exemplary embodiment with respect to change in the amount of generated power when the number of regions N of a storage device is "2" and PV is used as power-source equipment 1. In addition, each graph shown in FIG. 12 shows the state for a case in which the electric power supplied to the electric power distribution system in time T is fixed. The table shown in FIG. 12 shows the operating mode of each region of the storage device, as in FIG. 10.

The electric power control system of the third exemplary embodiment is capable of not only obtaining the same effects as the electric power control systems of the first exemplary embodiment and the second exemplary embodiment but requires only one storage device 2 as long as the required capacity is provided.

Although the invention of the present application has been described with reference to exemplary embodiments, the invention of the present application is not limited to the above-described exemplary embodiments. The configuration and details of the invention of the present application are open to various modifications within the scope of the invention of the present application that will be clear to any one of ordinary skill in the art.

This application claims the benefits of priority based on Japanese Patent Application No. 2010-100791 for which application was submitted on Apr. 26, 2010 and incorporates by citation all of the disclosures of that application.

The invention claimed is:

1. An electric power control system for controlling electric power that is supplied to an electric power distribution system, comprising:
   power-source equipment that supplies electric power that is generated;
   N storage devices that accumulate electric power that is generated by said power-source equipment;
   a communication device for transmitting information to and receiving information from a device that is provided to an electric power provider or to a consumer that is connected to said electric power distribution system; and
   an arithmetic unit that, in predetermined interval T, both causes continuous charging of electric power that is generated by said power-source equipment to each of said N storage devices in order and uses said communication device to report the amount of electric power that has accumulated in said storage devices after the charging is completed to a device that is provided to said electric power provider or to said consumer, and after the passage of T×(N−2)−T×(N−1) after this report was sent , causes the amount of electric power that was reported to the device that is provided to said electric power provider or to said consumer to be discharged from said storage device and supplied to said electric power distribution system,
   wherein N is a natural number of 3 or more.

2. An electric power control system for controlling electric power that is supplied to an electric power distribution system, comprising: power-source equipment that supplies electric power that is generated; N storage devices that accumulate electric power that is generated by said power-source equipment; a communication device for transmitting information to and receiving information from a device that is provided to an electric power provider or to a consumer that is connected to said electric power distribution system; and an arithmetic unit that, in predetermined interval T, both causes continuous charging of electric power that is generated by said power-source equipment to each of said N storage devices in order and uses said communication device to report the amount of electric power that has accumulated in said storage devices after the charging is completed to a device that is provided to said electric power provider or to said said consumer, and after the passage of T×(N−1)−T×N this report was sent, causes supplying to said electric power distribution system an amount of electric power that matches the amount of electric power that was reported to the device that is provided to said electric power provider or to said consumer by means of electric power that is being generated in said power-source equipment and electric power that is discharged from said storage device or electric power that is charged to said storage device to be supplied to said electrical power distribution system, wherein N is a natural number of 2 or more.

3. The electric power control system according to claim 1, further comprising:
  a selector that connects said power-source equipment to at least one of said storage devices and connects said electric power distribution system to at least one of said storage devices that differ from the storage device that is connected to said power-source equipment;
  wherein said arithmetic unit causes said storage devices to successively connect to said power-source equipment by means of said selector, causes said electric power distribution system to successively connect to storage devices that differ from the storage device that is connected to said power-source equipment, and causes an amount of electric power that has been charged to said storage device in said interval T to be supplied to said electric power distribution system after the passage of $T \times (N-2) - T \times (N-1)$ after the report was sent.

4. The electric power control system according to claim 2, further comprising:
  a selector that connects said storage devices, at least one device at a time, to said power-source equipment and to said electric power distribution system;
  wherein said arithmetic unit, for each said interval T, causes said storage devices to successively connect to said power-source equipment and to said electric power distribution system by means of said selector for each said interval T, and causes an amount of electric power that has been charged to said storage devices in said interval T to be supplied to said electric power distribution system after the passage of $T \times (N-1) - T \times N$ after the report was sent.

5. An electric power control method in an electric power control system for controlling electric power that is supplied to an electric power distribution system, said electric power control system being provided with:
  power-source equipment that supplies electric power that is generated;
  N storage devices that accumulate electric power that is generated by said power-source equipment; and
  a communication device for transmitting information to and receiving information from a device that is provided to an electric power provider or to a consumer that is connected to said electric power distribution system;
  said electric power control method comprising steps of:
    an arithmetic unit, in predetermined interval T, both causing continuous charging of electric power that is generated by said power-source equipment to each of said N storage devices in order and using said communication device to report the amount of electric power that has accumulated in said storage devices after the charging is completed to a device that is provided to said electric power provider or to said consumer; and
    after the passage of $T \times (N-2) - T \times (N-1)$ from said reporting, said arithmetic unit causing the amount of electric power that was reported to the device that is provided to said electric power provider or to said consumer to be discharged from said storage device and supplied to said electric power distribution system,
  wherein N is a natural number of 3 or more.

6. An electric power control method in an electric power control system for controlling electric power that is supplied to an electric power distribution system, said electric power control system being provided with:
  power-source equipment that supplies electric power that is generated;
  N storage devices that accumulate electric power that is generated by said power-source equipment; and
  a communication device for transmitting information to and receiving information from a device that is provided to an electric power provider or to a consumer that is connected to said electric power distribution system;
  said electric power control method comprising steps of:
    an arithmetic unit, in predetermined interval T, both causing continuous charging of electric power that is generated by said power-source equipment to each of said N storage devices in order and using said communication device to report the amount of electric power that has accumulated in said storage devices after the charging is completed to a device that is provided to said electric power provider or to said consumer; and
    after the passage of $T \times (N-1) - T \times N$ from the reporting, said arithmetic unit causing supply to said electric power distribution system of an amount of electric power that matches the amount of electric power that was reported to the device provided to said electric power provider or to said consumer by means of electric power that is being generated by said power-source equipment and electric power that was discharged from said storage device or electric power that was charged to said storage device to be supplied to said electrical power distribution system,
  wherein N is a natural number of 2 or more.

7. The electric power control method according to claim 5, further comprising:
  a selector that connects said power-source equipment to at least one of said storage devices and connects said electric power distribution system to at least one of said storage devices that differ from the storage device that is connected to said power-source equipment;
  wherein said arithmetic unit successively connects said storage devices to said power-source equipment by means of said selector for each said interval T, successively connects said electric power distribution system to said storage devices that differ from said storage device that is connected to said power-source equipment, and causes supplying to said electric power distribution system an amount of electric power that was charged to said storage devices in said interval T after the passage of $T \times (N-2) - T \times (N-1)$ after the reporting.

8. The electric power control method according to claim 6, further comprising:
  a selector that connects said storage devices to said power-source equipment and to said electric power distribution system, at least one storage device at a time;
  wherein said arithmetic unit successively connects said storage devices to said power-source equipment and to said electric power distribution system by means of said selector for each said interval T, and causes supplying to said electric power distribution system an amount of electric power that was charged to said storage devices in said interval T after the passage of $T \times (N-1) - T \times N$ after the reporting.

9. An information processing device for controlling electric power that is supplied to an electric power distribution system using an electric power control system that is provided with:

power-source equipment that supplies electric power that is generated; and

N storage devices that accumulate electric power that is generated by said power-source equipment;

said information processing device comprising:

a communication device for transmitting information to and receiving information from a device that is provided to an electric power provider or to a consumer that is connected to said electric power distribution system; and an arithmetic unit that both causes continuous charging of electric power that is generated by said power-source equipment in predetermined interval T to each of said N storage devices is order and that uses said communication device to report to a device that is provided to said electric power provider or to said consumer the amount of electric power that has accumulated in said storage devices after the charging is completed, and that, after the passage of $T \times (N-2) - T \times (N-1)$ from the reporting, causes supplying to said electric power distribution system the amount of electric power that was reported to the device that is provided to said electric power provider or to said consumer from said storage device, wherein N is a natural number of 3 or more.

10. An information processing device for controlling electric power that is supplied to an electric power distribution system using an electric power control system that is provided with:

power-source equipment that supplies electric power that is generated; and

N storage devices that accumulate electric power that is generated by said power-source equipment;

said information processing device comprising:

a communication device for transmitting information to and receiving information from a device that is provided to an electric power provider or to a consumer that is connected to said electric power distribution system; and an arithmetic unit that, in predetermined interval T, both causes continuous charging of electric power that is generated by said power-source equipment to each of said N storage devices in order and uses said communication device to report to a device that is provided to said electric power provider or to said consumer the amount of electric power that has accumulated in said storage devices after the charging is completed, and after the passage of $T \times (N-1) - T \times N$ after the reporting, causes supplying to said electric power distribution system an amount of electric power that matches the amount of electric power that was reported to the device that is provided to said electric power provider or to said consumer by means of electric power that is being generated by said power-source equipment or by electric power that is discharged from said storage device or electric power that is charged to said storage device to be supplied to said electrical power distribution system, wherein N is a natural number of 2 or more.

11. The information processing device according to claim 9, wherein said electric power control system further comprises:

a selector that connects said power-source equipment to at least one of said storage devices and connects said electric power distribution system to at least one of said storage devices that differ from the storage device that is connected to said power-source equipment;

wherein said arithmetic unit successively connects said storage devices to said power-source equipment by means of said selector for each said interval T, successively connects said electric power distribution system to said storage devices that differ from said storage device that is connected to said power-source equipment, and causes supplying to said electric power distribution system of amount of electric power that was charged to said storage devices in said interval T after the passage of $T \times (N-2) - T \times (N-1)$ after the reporting.

12. The information processing device according to claim 10, wherein said electric power control system further comprises:

a selector that connects said storage devices to said power-source equipment and to said electric power distribution system at least one said storage device at a time;

wherein said arithmetic unit successively connects said storage devices to said power-source equipment and to said electric power distribution system by means of said selector for each said interval T and causes supplying to said electric power distribution system an amount of electric power that was charged to said storage devices in each interval T after the passage of $T \times (N-1) - T \times N$ after the reporting.

* * * * *